Oct. 8, 1946.                W. L. STIVASON                 2,408,960
FLEXIBLE PIPE COUPLING
Filed July 25, 1944
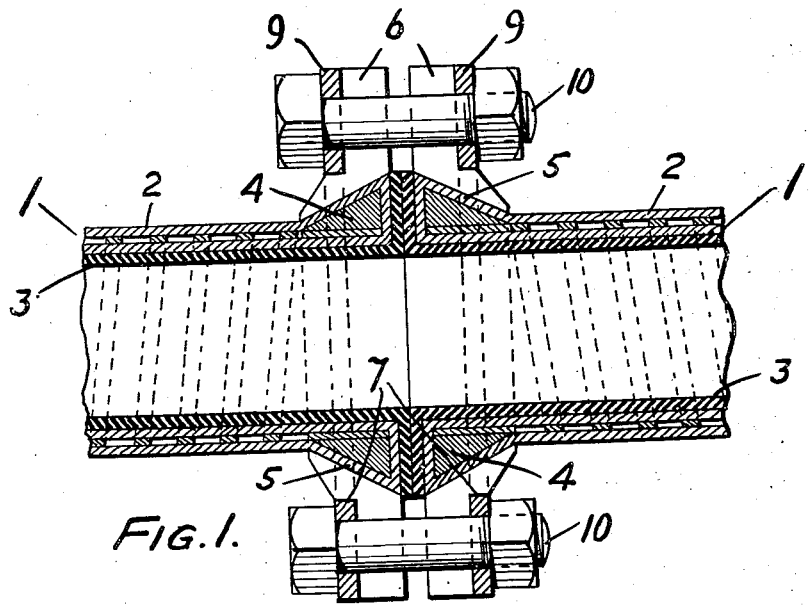
FIG. 1.
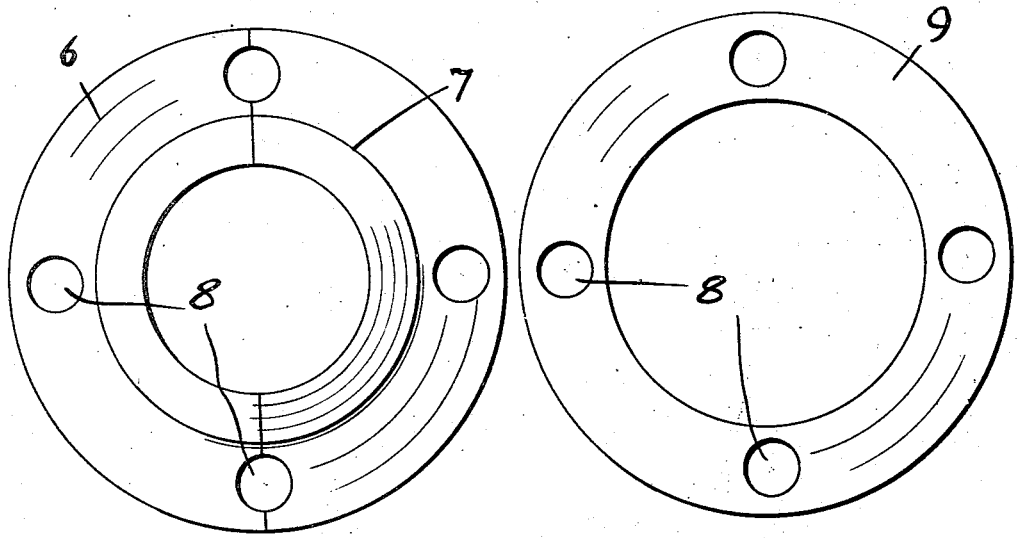
FIG. 2.                          FIG. 3.
WITNESS:
INVENTOR
William L. Stivason
BY
Augustus B. Stoughton
ATTORNEY.

Patented Oct. 8, 1946

2,408,960

UNITED STATES PATENT OFFICE 2,408,960

FLEXIBLE PIPE COUPLING

William L. Stivason, Hamilton Square, N. J., assignor to Whitehead Bros. Rubber Company, Trenton, N. J., a corporation of New Jersey Application July 25, 1944, Serial No. 546,511

1 Claim. (Cl. 285—138)

The principal objects of the present invention are to provide increased resistance or strength in respect to radial or bursting pressure and to do this by simple, comparatively inexpensive and easily applied means.

Other objects of the invention will appear from the following description at the end of which the invention will be claimed.

In the following description, reference will be made to the accompanying drawing forming part hereof and in which:

Fig. 1 is a longitudinal central sectional view illustrating features of the invention;

Fig. 2 is an elevational view of a sectional or split ring; and

Fig. 3 is a similar view of a continuous ring of larger internal diameter than the split ring shown in Fig. 2.

Referring to the drawing, 1 indicates a flexible pipe or hose of duck and rubber having an outer ply 2, and a lining 3 and a metal ring of wedge-shaped cross-section 4 arranged at the end of the pipe or hose and in a fold 5 of the outer ply with its inclined face disposed to flare outwards toward the end of the pipe. 6 is a split or two-part metal ring shaped on its inner surface to conform to the wedge shape of the hose or pipe end and provided on its outer face with a shoulder 7 for a purpose to be presently described. The split or sectional ring is shown as provided with bolt holes 8, two of which are located on the parting line. 9 is a continuous ring the internal diameter of which exceeds the external diameter of the flaring pipe or hose end and is commensurate with the diameter of the shoulder 7. The ring 9 is provided with bolt holes aligned with the bolt holes in the split ring. In other words, the bolt holes in each ring are similarly spaced.

In assembling the parts and for simplicity, referring to one hose end, the continuous ring 9 is passed over the flaring end of the hose or pipe, the split or sectional ring 6 is then applied to the flaring end of the pipe or hose, the continuous ring is then positioned on the shoulder 7, the bolts 10 are then arranged through the bolt holes and the nuts are applied so as to secure the parts in place.

When the parting line in the split ring is through a bolt hole and when the nuts are secured on the bolts, there is an advantage in that the compression of the bolts and nuts impart strength to the material of the hose ends. The shoulder 7 when present in co-operation with the continuous ring adds support against bursting pressure.

It will be obvious to those skilled in the art to which the invention relates that modifications may be made in details of construction or arrangement without departing from the spirit of the invention.

I claim:

A flexible pipe coupling including abutting ends of lengths of flexible pipe or hose, split rings applied to the outwardly flaring ends, continuous rings of greater diameter than the flaring end of the pipe or hose and nuts and bolts arranged through both rings, the parting line of the split disposed axially through the bolts in combination with the split ends of the rings and with the nuts of the bolts.

WILLIAM L. STIVASON.